United States Patent [19]

Takeshima et al.

[11] Patent Number: 5,141,906

[45] Date of Patent: Aug. 25, 1992

[54] CATALYST FOR PURIFYING EXHAUST GAS

[75] Inventors: Shinichi Takeshima, Susono; Toshiaki Tanaka, Numazu; Kiyohiko Oishi, Susono; Tokuta Inoue, Mishima, all of Japan

[73] Assignee: Toyota Jidosha Kabushiki Kaisha, Toyota, Japan

[21] Appl. No.: 723,306

[22] Filed: Jun. 28, 1991

[30] Foreign Application Priority Data

Jun. 29, 1990 [JP] Japan .................................. 2-170226
Feb. 22, 1991 [JP] Japan .................................. 3-28846
Mar. 26, 1991 [JP] Japan .................................. 3-62044

[51] Int. Cl.$^5$ ........................ B01J 29/06; B01J 37/20
[52] U.S. Cl. ......................................... 502/62; 502/75
[58] Field of Search ............................ 502/60, 62, 75; 423/213.2, 239

[56] References Cited

U.S. PATENT DOCUMENTS

| | | | |
|---|---|---|---|
| 3,337,447 | 8/1967 | Rigney et al. | 502/60 |
| 3,497,462 | 2/1970 | Kruerke | 502/75 |
| 4,170,571 | 9/1979 | Ritscher . | |
| 4,297,328 | 10/1981 | Ritscher et al. . | |
| 4,331,644 | 5/1982 | Ritscher . | |
| 4,738,947 | 4/1988 | Wan et al. . | |
| 4,877,590 | 10/1989 | Epperly et al. | 423/239 |
| 5,041,272 | 8/1991 | Tamura et al. | 423/239 |

FOREIGN PATENT DOCUMENTS

| | | |
|---|---|---|
| 0018117 | 10/1980 | European Pat. Off. . |
| 0311066 | 4/1989 | European Pat. Off. . |
| 0373665 | 6/1990 | European Pat. Off. . |
| 3912596 | 11/1989 | Fed. Rep. of Germany . |
| 57-36015 | 2/1982 | Japan . |
| 61-11147 | 1/1986 | Japan . |
| 1-130735 | 5/1989 | Japan . |
| 1-266854 | 10/1989 | Japan . |
| 309719 | 1/1970 | U.S.S.R. ........................ 423/213.2 |

OTHER PUBLICATIONS

Patent Abstracts of Japan, vol. 13, No. 379 (C-628 [3727], Aug. 22, 1989; and JP-A-01 130 735 (Toyotoa motor Corp.) May 23, 1989.

Primary Examiner—Carl F. Dees
Attorney, Agent, or Firm—Oblon, Spivak, McClelland, Maier & Neustadt

[57] ABSTRACT

A catalyst for purifying an exhaust gas comprising a zeolite catalyst ion-exchanged with a transition metal, which is heat-treated in a gas stream containing a sulfur oxide, optionally followed by washing with a glycol.

6 Claims, 3 Drawing Sheets

CATALYST A AND A': CONTROL CATALYST

CATALYST B AND B': CATALYST ACCORDING TO THE
PRESENT INVENTION

CATALYST FOR PURIFYING EXHAUST GAS

BACKGROUND OF THE INVENTION

1. Field of the Invention

The present invention relates to a catalyst for purifying an exhaust gas discharged from internal combustion engines such as those used in automobiles. More specifically, it relates to a catalyst for purifying an exhaust gas by purifying a $NO_x$-containing gas having a relatively high residual oxygen content, such as an exhaust gas discharged from automobiles under a lean combustion operation condition, wherein the air-fuel ratio is relatively higher than that of a theoretical air-fuel ratio.

2. Description of the Related Art

A catalyst capable of conducting an oxidation of, for example, carbon monoxide, hydrocarbons, simultaneously with a reduction of nitrogen oxides ($NO_x$) is generally used as a catalyst for purifying an exhaust gas discharged from internal combustion engines for automobiles and from industrial plants. Typical examples of such a catalyst known in the art include those prepared by coating a γ-alumina slurry on a refractory support, such as cordierite and calcining the coating and supporting thereon a noble metal, such as palladium, platinum or rhodium, or any mixture thereof. Many proposals have been made for an enhancement of the catalytic activity; for example, Japanese Unexamined Patent Publication (Kokai) No. 61-11147 discloses a catalyst comprising a γ-alumina particle stabilized with a rare earth metal oxide and a noble metal or the like dispersed thereon, wherein rhodium is dispersed on a particle substantially free from a rare earth oxide.

The conversion efficiency of the above-mentioned catalysts, however, is greatly influenced by the set air-fuel ratio of the engine, and a large amount of oxygen is present on the lean side, i.e., in the lean mixture, even after combustion, so that the oxidation is actively conducted but little reduction occurs. In contrast, on the rich side where the air-fuel ratio is low, since the amount of oxygen becomes small after combustion, the oxidation is inactive but the reduction is high. The catalyst functions most effectively around a theoretical air-fuel ratio (A/F=14.6) wherein a good balance between the oxidation and the reduction is provided, which has led to the use of a feedback control wherein the oxygen concentration of the exhaust system is detected to maintain the ratio of the air-fuel mixture at a theoretical air-fuel ratio.

Under the above-mentioned circumstances, a proposal has been made for a catalyst for purifying an exhaust gas which can remove $NO_x$ through a reduction even on the lean side (see Japanese Unexamined Patent Publication (Kokai) No. 1-130735). This catalyst comprises a zeolite ion-exchanged with a transition metal and can remove $NO_x$ with a high efficiency even in an oxygen rich atmosphere on the lean side where the air-fuel ratio is high.

A catalyst for combustion of a carbonaceous substance, comprising a zeolite type copper aluminosilicate containing a copper ion in the zeolite structure thereof is disclosed in, for example, Japanese Examined Patent Publication (Kokoku) No. 57-36015).

The above-mentioned zeolite catalyst ion-exchanged with a transition metal, such as copper, effectively reduces $NO_x$ even on the lean side. According to studies conducted by the present inventors, however, the $NO_x$ conversion was apt to become lower under actual service conditions or in an emission requirement mode, and the reason for this is believed to be as follows. For example, when a copper ion is deposited at a site other than the ion exchange sites of the zeolite, the copper becomes a copper oxide cluster during the steps of drying and calcination in the production of a catalyst. The copper cluster completely oxidizes hydrocarbons (HC) through the following reaction, which causes the amount of hydrocarbons used in the reduction of $NO_x$ to be reduced, whereby the $NO_x$ conversion is lowered.

$$2HC \rightarrow H_2O + CO_2$$

Since this reaction becomes particularly significant at a high temperature, the $NO_x$ conversion may be further lowered under actual service conditions or in an emission requirement mode. Further, since the zeolite structure of the zeolite catalyst may be broken with an elapse of time, the catalyst has a problem of durability.

SUMMARY OF THE INVENTION

Accordingly, an object of the present invention is to eliminate the above-mentioned problems of the prior art and to develop a catalyst which can effectively purify an exhaust gas when practically used.

Other objects and advantages of the present invention will be apparent from the following description.

In accordance with one aspect of the present invention, there is provided a catalyst for purifying an exhaust gas, comprising a zeolite catalyst ion-exchanged with a transition metal, which is heat-treated in a gas stream containing a sulfur compound.

In accordance with another aspect of the present invention, there is provided a catalyst for purifying an exhaust gas, comprising a zeolite catalyst ion-exchanged with a transition metal, which is heat-treated in a reducing gas stream containing a sulfur compound, followed by washing with a glycol.

BRIEF DESCRIPTION OF THE DRAWINGS

The present invention will be better understood from the description set forth below with reference to the accompanying drawings, in which.

DESCRIPTION OF THE PREFERRED EMBODIMENTS

In the catalyst according to the present invention, a zeolite is first ion-exchanged with a transition metal and then heat-treated with a reducing gas stream containing a sulfur compound.

As is well known, a zeolite is a crystalline aluminosilicate represented by the general formula:

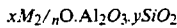

$$xM_{2/n}O \cdot Al_2O_3 \cdot ySiO_2$$

wherein M is a metal, such as Na, K, Ca or Ba, n is a valence, and x and y are each a positive number, and the pore size or the like varies depending upon M, x and y.

The zeolite is generally used as, for example, a catalyst, a molecular sieve, or adsorbent, through the utilization of the cation exchange capability and molecular sieving capability thereof, and is commercially available.

In the production of the catalyst according to the present invention, although any of the above-mentioned zeolites may be used as a starting material, preferably a zeolite having a pore size of about 5 to 10 Å, which is slightly larger than the size of $NO_x$, CO and HC molecules to be removed, is used. In the present invention, a metallic ion in the zeolite is first ion-exchanged with a transition metal, such as Cu, Co, Cr, Ni, Fe, Mg, Mn or the like. The ion exchange can be conducted, for example, by treating the zeolite with a metallic ion solution.

A solid catalyst may be prepared from the zeolite conventionally ion-exchanged with the transition metal by, for example, kneading the ion-exchanged catalyst with a binder comprising an alumina sol or a silica sol, wash-coating the resultant slurry on a suitable support (e.g., cordierite) and calcining the coated zeolite. Alternatively, a zeolite may be kneaded with a binder comprising, for example, an alumina sol or a silica sol, and thereafter, the resultant slurry may be wash-coated on the above-mentioned suitable support, ion-exchanged with a transition metal ion in a conventional manner, and then calcined.

The zeolite ion-exchanged with a transition metal is then heat-treated in a gas stream containing a sulfur compound according to the present invention. A typical example of the sulfur compound is hydrogen sulfide.

As one embodiment of the apparatus for heat-treating, in a gas stream containing a sulfur compound a zeolite catalyst ion-exchanged with a transition metal ion according to the present invention, a method of preparing the catalyst of the present invention wherein a copper ion is used as the transition metal and the ion-exchanged zeolite is heat-treated in a gas containing, for example, hydrogen sulfide will now be described with reference to FIG. 1.

Figure 1:
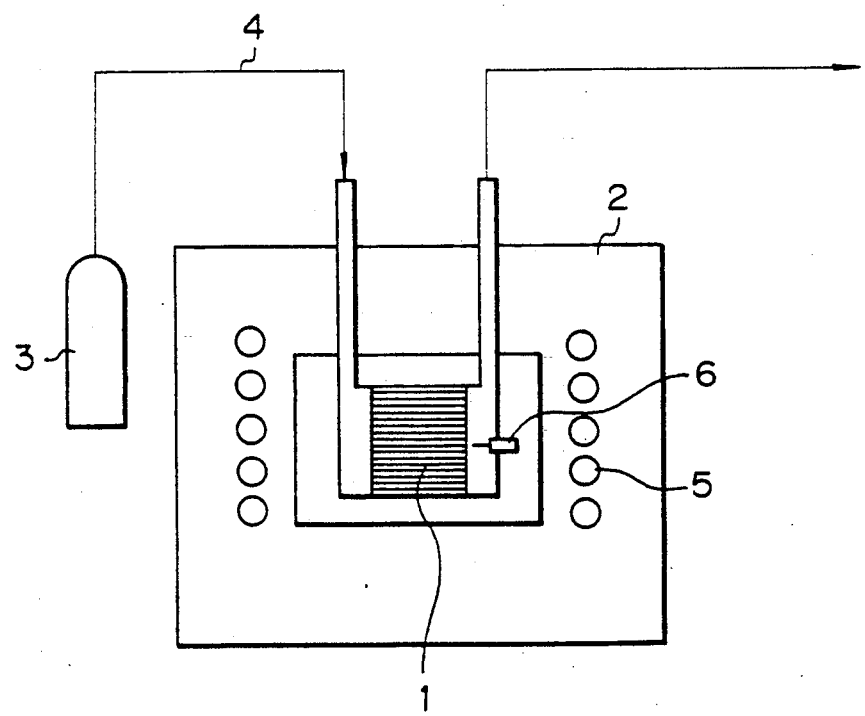
FIG. 1 is a diagram showing one embodiment of an apparatus used for heat-treating, in a gas stream containing a sulfur compound, a zeolite catalyst ion-exchanged with a transition metal.

As shown in FIG. 1, a zeolite catalyst 1 ion-exchanged with, for example, a copper ion is placed in, for example, an electric furnace 2, a hydrogen sulfide-containing gas 4 (the $H_2S$ concentration is not specifically limited but is preferably about 1,000 to 10,000 ppm) is made to flow from a hydrogen sulfide bomb 3 into the electric furnace 2, the temperature of the electric furnace 2 is raised by a heater 5 (the temperature is not specifically limited as long as the resultant sulfide is stable, but is usually about 500° to 700° C.) to sulfurize copper oxide or the like which is an oxidation product of a metallic ion deposited at a site other than the ion exchange sites during the ion exchange, thus converting the copper oxide to copper sulfide to eliminate the oxidizing activity. In this procedure, the copper ion deposited at the ion exchange sites of the zeolite is stably present. In FIG. 1, numeral 6 designates a thermocouple.

In the present invention, since the zeolite catalyst ion-exchanged with a transition metal is heat-treated in a gas stream containing a sulfur compound (e.g., $H_2S$), to convert a transition metal oxide derived from a transition metal ion deposited at a site other than the ion exchange sites of the zeolite to a sulfide, the catalytic activity of the oxide having a capability of oxidizing hydrocarbons is lost, which improves the $NO_x$ conversion in the $NO_x$ purification process. The presence of a transition metal in an oxide form in a catalyst may cause the structure of the zeolite to be broken, but the conversion of such an oxide to a sulfide enables the destruction of the structure to be effectively prevented.

As described above, according to the present invention, an exhaust gas purification catalyst having an improved $NO_x$ conversion efficiency is provided through a heat treatment of a zeolite catalyst ion-exchanged with a transition metal in a gas stream containing a sulfur compound, such as hydrogen sulfide, to convert a copper oxide cluster present on the zeolite to a copper sulfide cluster. In this catalyst, however, since the above-mentioned copper sulfide clogs part of pores of the zeolite, the active sites within the pores cannot be sufficiently utilized, and thus a $NO_x$ conversion sufficient to enable the catalyst to be put to practical use cannot be attained.

Figure 2:
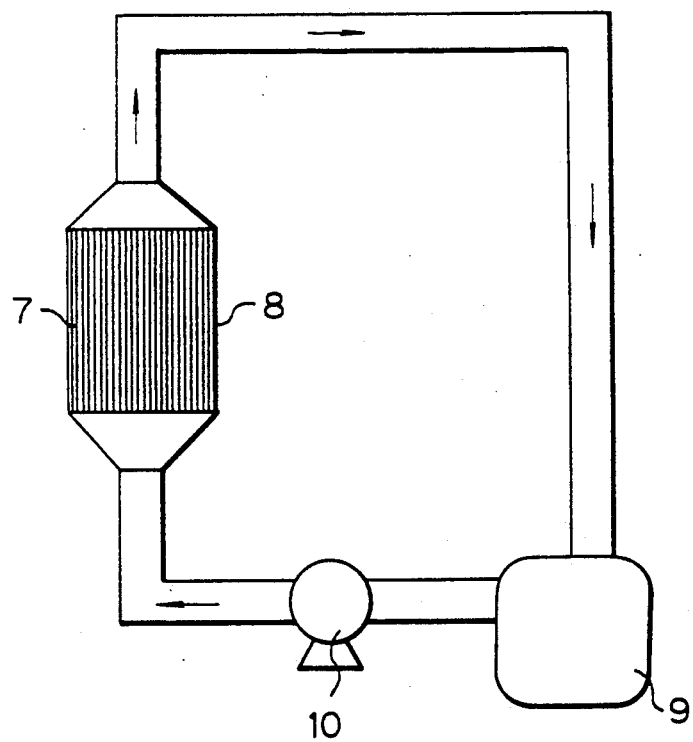
FIG. 2 is a diagram showing one embodiment of an apparatus used for washing with glycol a zeolite catalyst heat-treated with a sulfur compound.

In a second embodiment of the present invention, although a copper sulfide cluster is formed on the surface of the zeolite catalyst prepared above, the copper sulfide cluster is dissolved in a glycol (for example, pure liquid ethylene glycol, propylene glycol). On the other hand, the ion-exchanged copper ion is soluble in an acid or strong alkaline solution but insoluble in a nonelectrolyte such as glycol. Therefore, only the copper sulfide cluster present around the surface of the catalyst can be selectively washed away by taking advantage of this property. Although there is no specific limitation to the temperature of washing with glycol, the temperature is preferably 120° to 170° C. The washing with the glycol can be conducted, for example, as shown in FIG. 2, by circulating a glycol, by using a pump 10, from a tank 9 containing the glycol through a container 8 packed with a zeolite catalyst 7 treated with a sulfur compound. A repetition of the washing a plurality of times, each with fresh glycol, enables the washing to be more efficiently conducted. After the washing, calcination is conducted by a conventional procedure, to prepare a desired catalyst.

According to the inventors studies, as described above, the conventional catalysts exhibited only a low $NO_x$ conversion under an actual service condition or in an emission requirement mode. It has been confirmed that the low $NO_x$ conversion is attributable to the fact that HC is wastefully consumed due to an high oxidizing activity of HC, which inhibits any improvement of the $NO_x$ conversion. Further, when the exhaust gas temperature is high, the $NO_x$ conversion efficiency of the lean $NO_x$ catalyst is greatly reduced, because a direct oxidation of the HC components to $CO_2$ is promoted at a high temperature.

Also, with respect to the durability, it has been confirmed that, for example, in a zeolite catalyst ion exchanged with copper, the copper oxide cluster deposited on the surface of the catalyst promotes the deterioration of the catalyst. The copper oxide cluster reacts with, for example, a zeolite skeleton to form a copper aluminate, thereby causing the zeolite skeleton to be broken. When the zeolite is ion-exchanged with copper by a conventional ion exchange process, the copper ion present in the solution not only brings about an ion exchange but also unfavorably forms a copper oxide cluster on the surface of the zeolite.

When the ion exchange rate is low, the amount formed of the copper oxide cluster is relatively small. In this case, however, the durability is lower to that in the case of a higher ion exchange rate. This is because, when the ion exchange rate is low, the stability of the ion-exchanged copper ion is low and the copper ion easily migrates and agglomerates within the zeolite during the use of the catalyst to form a copper oxide cluster, thereby causing the deterioration of the catalyst to be accelerated. For this reason, to improve the durability, it is necessary to ion-exchange all the ion exchange sites with the copper ion, to stabilize the copper ion, and at the same time, to prevent the formation of the copper oxide cluster on the surface of the zeolite.

According to the second embodiment of the present invention, first an oxide, such as a copper oxide cluster, is sulfidated to convert it to, for example, a copper sulfide cluster, and the copper sulfide cluster is selectively washed away and removed through dissolution in glycol. This prevents a clogging of pores with the copper sulfide cluster, and at the same time, enables the active sites within the pores to be effectively utilized, which contributes to an improvement of the $NO_x$ conversion.

EXAMPLES

The present invention will now be further illustrated by, but is by no means limited to, the following Examples.

EXAMPLE 1 (PRODUCTION EXAMPLE)

A powder of a ZSM-5 zeolite (manufactured by Tosoh Corporation) having a Si/Al ratio of 40 and a pore size of 5.5 Å was immersed at room temperature in a 0.01 N aqueous copper acetate solution for several days to prepare a copper ion-exchanged zeolite. Separately, an alumina sol and a silica sol were mixed with each other so that the Si/Al ratio was 40, thereby preparing a slurry binder. Then, 100 parts by weight of the above-described copper ion-exchanged zeolite and 100 parts by weight of water were added and mixed with 70 parts by weight of the slurry binder, and a diluted aqueous ammonia was added thereto to adjust the pH value to 7.0 to 8.6, to thereby prepare a slurry. The slurry was wash-coated on 0.7 liter of a honeycomb support of cordierite (manufactured by NGK Insulators, Ltd.), and dried and calcined at 600° to 650° C. to prepare a copper ion-exchanged zeolite catalyst (hereinafter referred to as "Catalyst A").

Then, the Catalyst A was placed as a catalyst 1 in an electric furnace 2 shown in FIG. 1, and a gas (diluted with nitrogen) containing 1000 ppm of $H_2S$ was made to flow from a hydrogen sulfide bomb 3 into the electric furnace 2. The electric furnace 2 was adjusted so that the exhaust gas temperature at the outlet thereof was about 600° C., and a reaction was allowed to proceed for about 4 hours. Accordingly, the copper (i.e., copper oxide) deposited at a site other than the ion exchange sites during the ion exchange was sulfurized, and thus a sulfurized catalyst (hereinafter referred to as "Catalyst B") was prepared.

EXAMPLE 2 (PRODUCTION EXAMPLE)

A cobalt ion-exchanged zeolite catalyst (hereinafter referred to as "Catalyst A'") was prepared in the same manner as in Example 1, except that a mixture of cobalt acetate with cobalt nitrate (1:1) was used instead of the copper acetate. A sulfurized catalyst (hereinafter referred to as "Catalyst B'") was prepared in the same manner as in Example 1, except that the exhaust gas temperature at the outlet of the electric furnace 2 was adjusted to 700° C.

EXAMPLE 3 (EVALUATION EXAMPLE)

Catalysts A and A' (Control) and Catalysts B and B' (catalysts of the present invention) prepared in Examples 1 and 2 were evaluated to determine the purifying activity thereof in the 10 mode (volume of catalyst: 0.7 liter; vehicle: 1.6 liter lean burn; running mode: 10 mode)

The results are given in Table 1.

TABLE 1

| | Conversion efficiency (%) | | |
|---|---|---|---|
| | HC | CO | $NO_x$ |
| Catalyst A*1 | 85.7 | −10.8*3 | 52.8 |
| Catalyst B*2 | 40.2 | −10.1*3 | 53.5 |
| Catalyst A'*1 | 60.4 | −5.9*3 | 43.3 |
| Catalyst B'*2 | 37.5 | −7.0*3 | 46.0 |

Note:
*1Control
*2Catalyst according to the present invention
*3Partial oxidation of HC increases the value.

As apparent from the results given in Table 1, Catalysts B and B' according to the present invention exhibited a remarkable reduction in the conversion of the hydrocarbons (HC), which clearly suggests that these catalysts have a reduced oxidizing activity. That is, the object of the present invention is to effectively use the active sites of the catalyst for the reduction of $NO_x$ by suppressing the consumption of the active sites for the oxidation of HC. The above tests clearly show the desired results. Although there are no substantial increases in the reduction of $NO_x$, this is because the reduction rate is determined by the number of the active sites. This is clearly shown in Table 2 below.

Next, a test was conducted in the 10 mode, in the same manner as that described above except that the volume of the catalyst was increased from 0.7 liter to 1.7 liters, and the results are given in Table 2.

TABLE 3

| | Conversion efficiency (%) | | |
|---|---|---|---|
| | HC | CO | $NO_x$ |
| Catalyst A*1 | 95.3 | 60.5 | 56.7 |
| Catalyst B*2 | 71.0 | 15.2 | 75.8 |
| Catalyst A'*1 | 80.3 | 10.5 | 52.5 |
| Catalyst B'*2 | 65.4 | 5.7 | 62.0 |

Note:
*1Control
*2Catalyst of the present invention
*3Partial oxidation of Hc increases the value.

As apparent from the results given in Table 2, when the volume of the catalyst is increased (i.e., the number of the active sites is increased), an increase in the $NO_x$ conversion was observed in the case of Catalysts B and B' of the present invention, but substantially no increase in the $NO_x$ conversion was observed in the case of Catalysts A and A' as the control catalysts.

Further, Catalysts A and A' (control catalysts) and Catalysts B and B' (catalysts of the present invention) prepared in Examples 1 and 2 were evaluated to determine the purifying activity thereof in a high-speed operation on the lean side, through the use of these catalysts in a volume of 0.7 liter.

Figure 3:
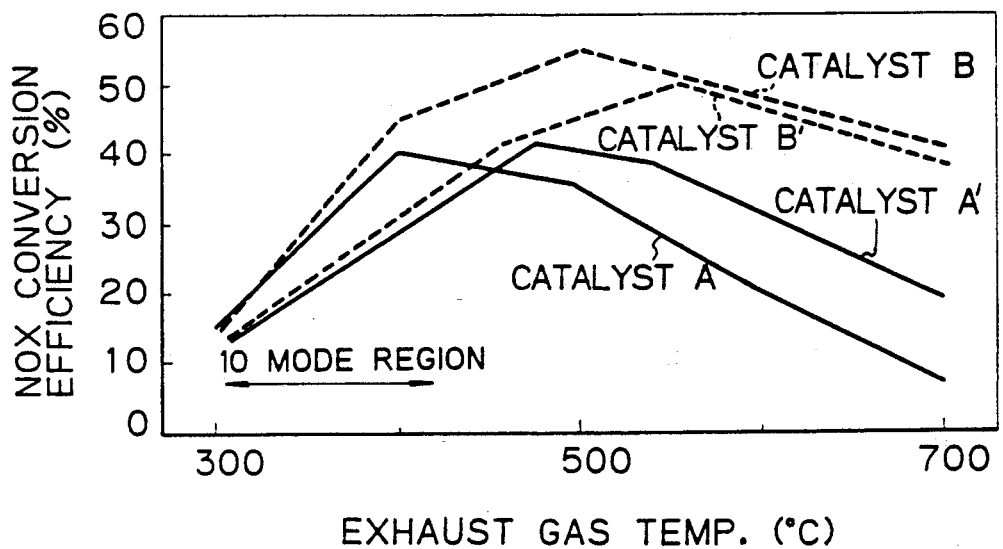
FIG. 3 is a graph showing the results of tests conducted in Example 4.

The results were as shown in FIG. 3.

As shown in FIG. 3, under a high-speed condition, the gas temperature at the inlet of the exhaust gas catalyst system increased to 600° to 700° C., and the oxidation reaction of hydrocarbons became more significant. In this case, the $NO_x$ conversion of Catalysts A and A'

(control catalysts) was remarkably reduced with the raising of the temperature. In contrast, no significant lowering during the $NO_x$ conversion was observed in the case of Catalysts B and B' (catalysts of the present invention).

As described above, according to the present invention, a zeolite catalyst is subjected to an ion exchange with a transition metal, such as copper or cobalt, heat-treated in a gas stream containing a sulfur compound, such as hydrogen sulfide, to convert, for example, an oxide of a transition metal, such as copper oxide or cobalt oxide, present at a site other than the ion exchange sites to a sulfide, such as copper sulfide or cobalt sulfide, to thereby stabilize the zeolite. This effectively solves, through the conversion of the oxide to sulfide, a problem of a lowering in the conversion of $NO_x$ in an exhaust gas caused by an oxidation of hydrocarbons in the exhaust gas due to an oxidizing activity of an oxide, such as copper oxide or cobalt oxide. On the other hand, the copper oxide and cobalt oxide have an adverse effect and break the structure of the zeolite, and this causes the pores to be clogged and the ion-exchanged transition metal, such as copper, to be precipitated, and thus the catalytic activity is lost.

The sulfidation treatment according to the present invention converts copper oxide and cobalt oxide, etc., to copper sulfide and cobalt sulfide, etc., to stabilize the zeolite, which prevents the destruction of the structure of the zeolite, and thus remarkably improves the durability of the catalyst.

EXAMPLE 4 (PRODUCTION EXAMPLE)

(i) Preparation of zeolite catalyst:

A power of a ZSM-5 zeolite (manufactured by Tosoh Corporation) having a Si/Al ratio of 40 and a pore size of 5.5 Å was immersed at room temperature in a 0.01 N aqueous copper acetate solution for several days to prepare a copper ion-exchanged zeolite. Separately, an alumina sol and a silica sol were mixed with each other so that the Si/Al ratio was 40, to thereby prepare a slurry binder. Then 100 parts by weight of the above-described copper ion-exchanged zeolite and 100 parts by weight of water were added and mixed with 70 parts by weight of the binder, and an aqueous ammonia (diluted) was added thereto to adjust the pH value to 7.0 to 8.6, to thereby prepare a slurry, the slurry was washcoated on 0.7 liter of a honeycomb support of cordierite (manufactured by NGK insulators, Ltd.), and dried and calcined at 600° to 650° C. to prepare a copper ion-exchanged zeolite catalyst (hereinafter referred to as "Catalyst C").

(ii) Treatment of Catalyst C with sulfur compound:

Then, the Catalyst C was placed as a catalyst 1 in an electric furnace 2 shown in FIG. 1, and a gas (diluted with nitrogen) containing 1000 ppm of $H_2S$ was made to flow from a hydrogen sulfide bomb into the electric furnace. In this case, the gas flow rate was sufficient to sulfidate all of the copper deposited at a site other than the ion-exchange sites of the catalyst. The electric furnace 2 was adjusted so that the exhaust gas temperature at the outlet was about 600° C., and a reaction was allowed to proceed for about 4 hr. Thus, the copper (i.e., copper oxide) deposited at a site other than the ion exchange sites during the ion exchange was sulfidated, to thereby prepare a sulfided catalyst (hereinafter referred to as "Catalyst C'").

(iii) Washing of sulfided Catalyst C' with glycol:

In a washing apparatus shown in FIG. 2, an ethylene glycol from which water had been removed by distillation was made to flow through a Catalyst C' treated with $H_2S$ in the above-described manner, to thereby dissolve the copper sulfide cluster deposited on Catalyst C'. The washed Catalyst C' was taken out of the apparatus, and the ethylene glycol in the glycol tank 9 was replaced with fresh ethylene glycol, for a secondary washing. After the secondary washing, the catalyst was dried in vacuo for about 3 hr and then dried in nitrogen at 150° C. for one day. Further, the catalyst was calcined at 600° C. in air to prepare a treated catalyst (hereinafter referred to as "Catalyst C''").

Accordingly, the ion exchange sites within the zeolite were ion-exchanged with a copper ion, and the copper sulfide cluster as an impurity present on the surface of the zeolite was removed.

EXAMPLE 5 (PRODUCTION EXAMPLE)

A cobalt ion-exchanged zeolite catalyst (Catalyst D), a sulfided catalyst prepared by a sulfidation of Catalyst D (Catalyst D'), and a catalyst prepared by washing Catalyst E with a glycol (Catalyst D'') in the same manner as in Example 4, except that cobalt acetate was used instead of copper acetate, were obtained.

EXAMPLE 6 (EVALUATION EXAMPLE)

Catalysts C, C', C'', D, D' and D'' prepared in Examples 4 and 5 were evaluated to determine the purifying activity thereof in the 10 mode (volume of catalyst: 0.71 liter; vehicle: 1.6 liter lean burn; running mode: 10 mode)

The results are given in Table 3.

TABLE 3

| Catalyst | Conversion efficiency (%) | | |
|---|---|---|---|
| | HC | CO | $NO_x$ |
| C | 85.7 | −10.8 | 52.8 |
| C' | 40.2 | −10.1 | 53.5 |
| C'' | 50.9 | 25.3 | 65.2 |
| D | 60.4 | −5.9 | 43.3 |
| D' | 37.5 | −7.0 | 46.0 |
| D'' | 44.0 | 5.0 | 51.8 |

As apparent from the results shown in Table 3, the HC conversion in the 10 mode of Catalyst C' and D' remarkably lower than that of Catalysts C or D. This clearly shows that Catalysts C' and D' have a reduced oxidizing activity. Also, the HC conversion of Catalyst C'' or D'' was lower to some extent than that of Catalyst C or D, but in this case, the extent of the lowering is less than that in the case of Catalyst C' or D', and a remarkable improvement in the $NO_x$ conversion was observed. As apparent from a comparison of Catalyst C'' or D'' with Catalyst C' or D', Catalysts C'' or D'' exhibited a considerably improved HC conversion and $NO_x$ conversion, compared to Catalyst C' or D'.

Catalyst C'' or D'' had a high activity despite a small capacity. This is believed to be because, as opposed to Catalyst C' or D' wherein inactive copper sulfide is present around the surface of the catalyst, in Catalyst C'' or D'', since the copper sulfide has been removed, the ion exchange sites within the pores are effectively utilized.

With respect to the above-mentioned catalyst C'' wherein a particular HC component remains, the exhaust gas was previously cracked in the presence of an oxidation catalyst to remove the HC component, and thereafter, use was made of the lean NO$_x$ catalyst of the present invention, and as a result, the NO$_x$ conversion was further increased.

As described above, according to the present invention, a zeolite catalyst subjected to an ion exchange with a transition metal, such as copper or a noble metal, is heat-treated in a gas stream containing a sulfur compound, such as hydrogen sulfide, to convert, for example, an oxide of a transition metal, such as copper oxide, present at a site other than the ion exchange sites to a sulfide, such as a copper sulfide cluster, and the sulfide or the like is dissolved away through washing with glycol. This constitution enables the active sites within the pores clogged with the copper sulfide cluster to be effectively utilized, which contributes to an improvement in the NO$_x$ conversion due to the increase in the active sites.

We claim:

1. A catalyst for purifying an exhaust gas, comprising a zeolite catalyst ion exchanged with a transition metal selected from the group consisting of Cu, Co, Cr, Ni, Fe, Mg and Mn, said ion-exchanged zeolite catalyst being heat-treated at a temperature of 500° to 700° C. in a gas stream containing a sulfur compound.

2. A catalyst as claimed in claim 1, wherein said zeolite has a pore size of 5° to 10° Å.

3. A catalyst as claimed in claim 1, wherein the transition metal is at least one component selected from the group consisting of Cu and Co.

4. A catalyst as claimed in claim 1, wherein the sulfur compound is hydrogen sulfide.

5. A catalyst for purifying an exhaust gas, comprising a zeolite catalyst ion exchanged with a transition metal, said ion-exchanged zeolite catalyst being heat-treated in a gas stream containing a sulfur compound, wherein the heat-treated catalyst is washed with a glycol.

6. A catalyst as claimed in claim 5, wherein the glycol is ethylene glycol.

* * * * *